No. 662,512. Patented Nov. 27, 1900.
A. K. WOLFE.
WHIFFLETREE HOOK.
(Application filed May 11, 1900.)
(No Model.)
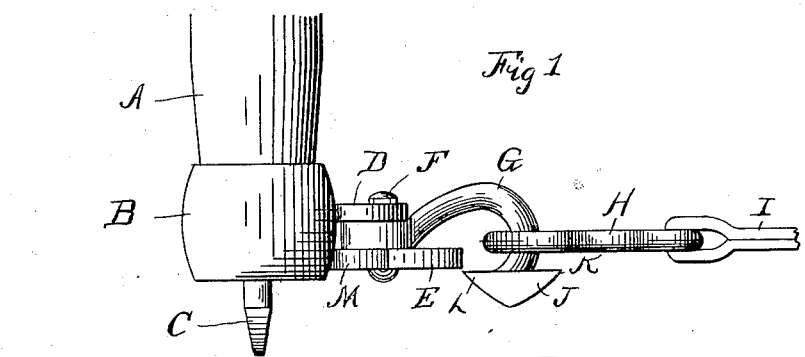
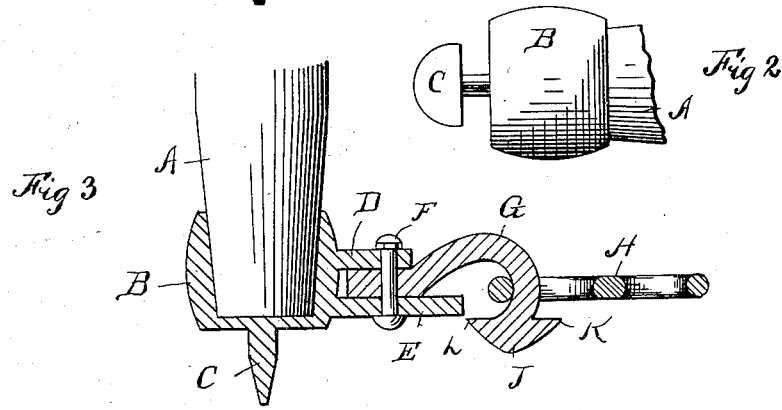
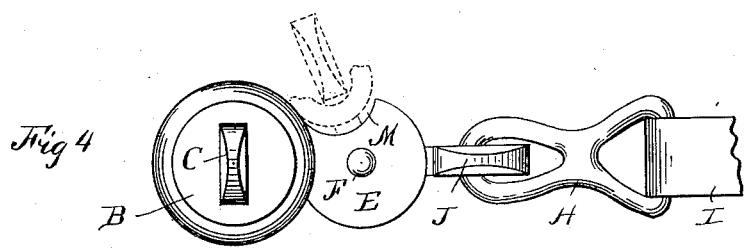
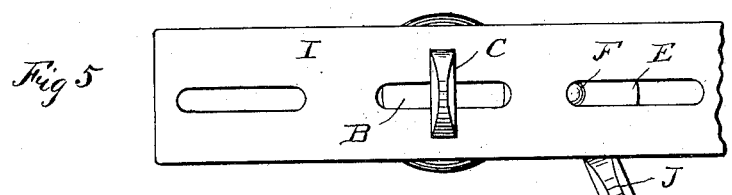
WITNESSES:
A. K. Wolfe,
INVENTOR
BY
Warren D. House,
His ATTORNEY

UNITED STATES PATENT OFFICE.

ABNER K. WOLFE, OF KANSAS CITY, KANSAS.

WHIFFLETREE-HOOK.

SPECIFICATION forming part of Letters Patent No. 662,512, dated November 27, 1900.

Application filed May 11, 1900. Serial No. 16,292. (No model.)

*To all whom it may concern:*

Be it known that I, ABNER K. WOLFE, a citizen of the United States of America, residing in Kansas City, in the county of Wyandotte and State of Kansas, have invented a new and useful Improvement in Whiffletree-Hooks, of which the following is a specification, reference being had therein to the accompanying drawings.

My invention relates to improvements in whiffletree-hooks.

The object of my invention is to provide a whiffletree-hook adapted to be used with tugs or traces provided with one or more eyes for engagement with the hook.

My invention comprises a socket for securing upon the end of a whiffletree, the said socket having pivoted laterally to it a hook for engaging the trace or tug, means being provided by which the tug in its working position cannot slip off the hook, but which may be readily released therefrom by swinging the hook to a certain position.

My invention is provided, further, with an outwardly-extending hook adapted to be used when the tug or trace is provided with a plurality of eyes.

My invention provides also, in connection with the swinging hook, a guard that normally prevents disengagement of the hook from the tug, but which is provided with a notch opposite which the hook may be swung, so as to permit the insertion of or disengagement from the hook of the tug.

In the accompanying drawings, illustrative of my invention, Figure 1 represents a top view of the outer end of a whiffletree provided with my invention. In this figure the eye of a tug or trace is shown engaged with the swinging hook. Fig. 2 represents a rear elevational view. Fig. 3 represents a horizontal sectional view of the parts shown in Fig. 1. Fig. 4 represents an end elevational view; and Fig. 5 represents also an end elevational view, with the outwardly-extending hook engaged with a trace having a plurality of eyes.

Similar letters of reference indicate similar parts.

A indicates the whiffletree, B the socket, and C the hook, such as is commonly used on the ends of whiffletrees. Forwardly extending from the side of the socket B are two ears D and E, respectively, between which is pivoted, by means of a bolt F, the rear end of a swinging hook G, the free end of which is adapted to engage the ordinary eye H of a tug I and the extreme end of which is provided with a head J, which is provided with forwardly and rearwardly extending projections or tangs K and L, respectively. The outer periphery of the guard E is arcuate in form and is so related to the tang L of the hook G as to prevent the passage between them of the tug-eye H. The upper side of the guard E is provided with a curved notch M, adapted, when the hook G is swung into position, (shown in dotted lines in Fig. 4,) to permit the insertion or withdrawal of the eye H. It will be noted that the form of the eye H is oblong, so that when the hook is swung into the position opposite the notch M the tangs K and L prevent the removal of the tug-eye when the tug is in the normal position and the eye must be turned from the normal position, so that the opening in the eye in which the hook is inserted will have its longer axis parallel with the length of the head of the hook. When the tug-eye and the hook G are turned to the position shown in dotted lines in Fig. 4, the eye may be readily removed from the hook through the notch M of the guard E.

When the tug or trace is provided with a plurality of longitudinally-disposed openings, such as are shown in Fig. 5, the swinging hook cannot be employed. Consequently I have provided in connection with the socket B the hook C, the head of which is similar in form to the head J of the hook G, the long diameter of the head being disposed at right angles to the long diameters of the slots or holes in the tug.

With my invention any form of trace or tug can be used. It is preferable, of course, for the purpose of safely securing the tug that where possible it be placed upon the swinging hook G.

My invention may be variously modified without departing from its spirit.

Having thus described my invention, what I claim, and desire to secure by Letters Patent, is—

1. A whiffletree-hook comprising a socket adapted to be secured upon the end of a whiffletree and provided with a lateral projection having a curved periphery, a hook pivoted upon the said projection and provided with a head having forwardly and rearwardly extending projections, one of which swings adjacent to the curved periphery of the lateral projection, the lateral projection being provided with a notch opposite to which the head of the hook may be swung, substantially as described.

2. A whiffletree-hook comprising a socket adapted to be secured upon the end of a whiffletree, two laterally-extending projections on the socket, one of which is provided with an arcuate-shaped periphery having therein a notch, a swinging hook having one end pivotally mounted between the two projections, the free end of the hook having forwardly and rearwardly extending tangs one of which is adapted to swing adjacent to the curved periphery of the lateral projection to a point opposite the recess therein, substantially as described.

3. A whiffletree-hook comprising a socket adapted to be secured on the end of a whiffletree and being provided with a lateral projection having a peripheral recess or notch, a hook pivoted to the said projection and provided at its free end with an oblong head adapted to swing in close proximity to the lateral projection and to pass opposite the notch thereof, substantially as described.

4. A whiffletree-hook comprising a body portion for securing to the end of a whiffletree and provided at its outer end with a tug-engaging hook and provided at right angles to the said hook, with a forwardly-extending projection, provided with a peripheral notch, a tug-engaging hook pivoted to the said projection and provided with an oblong head adapted to swing in close proximity to the projection and to pass opposite the notch thereof, substantially as described.

5. A whiffletree-hook comprising a body portion provided with a socket for the insertion of a whiffletree, the body portion being provided with a tug-engaging hook disposed in the axis of the whiffletree, and provided also, with two lateral projections disposed at right angles to the said axis, one of the said projections being provided near its rear end with a peripheral notch, a tug-engaging hook pivotally mounted between the two projections and having an oblong head on its free end adapted to swing in close proximity to the notched projection and to pass opposite the said notch, substantially as described.

In testimony whereof I have signed my name to this specification in the presence of two subscribing witnesses.

ABNER K. WOLFE.

Witnesses:
WARREN D. HOUSE,
DENTON DUNN.